US008699554B2

(12) United States Patent
Waters et al.

(10) Patent No.: US 8,699,554 B2
(45) Date of Patent: Apr. 15, 2014

(54) SCALING TO REDUCE WIRELESS SIGNAL DETECTION COMPLEXITY

(75) Inventors: Deric W. Waters, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1485 days.

(21) Appl. No.: 11/928,050

(22) Filed: Oct. 30, 2007

(65) Prior Publication Data

US 2008/0137720 A1 Jun. 12, 2008

Related U.S. Application Data

(60) Provisional application No. 60/869,960, filed on Dec. 14, 2006.

(51) Int. Cl.
*H03H 7/30* (2006.01)
*H03K 5/159* (2006.01)

(52) U.S. Cl.
USPC ............ 375/230; 375/229; 375/231; 375/232

(58) Field of Classification Search
USPC .......................... 375/229, 231, 236, 232, 262
See application file for complete search history.

(56) References Cited

U.S. PATENT DOCUMENTS

| | | | | |
|---|---|---|---|---|
| 2004/0082356 A1* | 4/2004 | Walton et al. | ................. | 455/522 |
| 2004/0181419 A1* | 9/2004 | Davis et al. | ....................... | 705/1 |
| 2005/0141460 A9* | 6/2005 | Currivan et al. | ............... | 370/335 |
| 2006/0210070 A1* | 9/2006 | Reznik et al. | .................... | 380/33 |
| 2007/0201632 A1* | 8/2007 | Ionescu | ....................... | 379/88.01 |
| 2008/0187034 A1* | 8/2008 | Liang et al. | ................... | 375/232 |
| 2008/0225974 A1* | 9/2008 | Prasad et al. | ................... | 375/262 |

OTHER PUBLICATIONS

Hochwald, Bertrand M. et al., "Achieving Near-Capacity on a Multiple-Antenna Channel," IEEE Transactions on Communications, vol. 51, No. 3, Mar. 2003, pp. 389-399.

Waters, Deric, "Signal Detection Strategies and Algorithms for Multiple-Input Multiple-Output Channels," A Thesis Presented to the Academic Faculty, Georgia Institute of Technology, Dec. 2005, 122 pages. Found at: http://smartech.gatech.edu/handle/1853/7514.

Wubben, D. et al., "Efficient Algorithm for Decoding Layered Space-Time Codes," Electronics Letters, Oct. 25, 2001, vol. 37, No. 22, pp. 1348-1350.

* cited by examiner

*Primary Examiner* — Qutbuddin Ghulamali

(74) *Attorney, Agent, or Firm* — Steven A. Shaw; Wade James Brady, III; Frederick J. Telecky, Jr.

(57) ABSTRACT

In at least some embodiments, a receiver for a wireless communication system is provided. The receiver includes an equalizer that provides an equalized channel matrix. The receiver also includes scaling logic coupled to the equalizer, the scaling logic selectively scales coefficients of the equalized channel matrix. The receiver also includes a decoder coupled to the scaling logic. The decoder decodes a signal based on the equalized channel matrix with scaled coefficients.

12 Claims, 3 Drawing Sheets

SCALING TO REDUCE WIRELESS SIGNAL DETECTION COMPLEXITY

CROSS-REFERENCE TO RELATED APPLICATIONS

The present application claims priority to U.S. provisional patent application Ser. No. 60/869,960, entitled "Scaling To Reduce MIMO Detection Complexity", filed on Dec. 14, 2006. The above-referenced application is incorporated herein by reference.

FIELD OF THE INVENTION

The present disclosure is directed to wireless communication systems, and more particularly, but not by way of limitation, to wireless communication systems that implement Multiple-input Multiple-Output (MIMO) antenna technology.

BACKGROUND

As consumer demand for high data rate applications, such as streaming video, expands, technology providers are forced to adopt new technologies to provide the necessary bandwidth. Multiple-input Multiple-Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many MIMO detection algorithms have been proposed. The maximum-likelihood detector, while conceptually simple and exhibiting optimal detection performance, is often impractical because its complexity increases exponentially with the number of input channels and constellation size. Consequently, a vast assortment of algorithms have been proposed to solve the detection problem with reduced complexity while sacrificing minimal performance. Many MIMO detectors have been proposed exclusively as hard detectors that give only the final estimate of the channel input. Most notable is the sphere detector because it can achieve near maximum-likelihood performance in an uncoded system with much less complexity on average. A summary of many other previously proposed MIMO detectors is given in Deric W. Waters, Signal Detection Strategies and Algorithms for Multiple-input Multiple-Output Channels (December 2005) (unpublished Ph.D. dissertation, Georgia Institute of Technology), http://etd.gatech.edu, including many variations of the sphere detector that have been proposed to minimize complexity without sacrificing performance. In Bernard M. Hochwald & Stephan ten Brink, *Achieving Near-Capacity on a Multiple-Antenna Channel*, 51 IEEE TRANSACTIONS ON COMMUNICATIONS 389-99 (2003), the list-sphere detector was proposed as a way to compute the log-likelihood ratio (LLR) for the channel input. There is an ongoing need to design wireless signal detectors with low complexity and good performance.

SUMMARY

In at least some embodiments, a receiver for a wireless communication system is provided. The receiver comprises an equalizer that provides an equalized channel matrix. The receiver further comprises scaling logic coupled to the equalizer, the scaling logic selectively scales coefficients of the equalized channel matrix. The receiver further comprises a decoder coupled to the scaling logic. The decoder decodes a signal based on the equalized channel matrix with scaled coefficients.

In at least some embodiments, a wireless communication system is provided. The wireless communication system comprises a transmitter that transmits a signal. The wireless communication system further comprises a communication channel. The wireless communication system further comprises a receiver that receives the signal through the communication channel. The receiver decodes the signal based on an equalized channel matrix that is scaled to reduce a number of coefficients.

In at least some embodiments, a method for wireless communication is provided. The method comprises equalizing a channel estimation matrix. The method further comprises scaling coefficients of the equalized channel matrix to reduce a computational burden of decoding the signal.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure provide a novel algorithm and architecture that may be used to reduce complexity for many types of (Multiple-input Multiple-Output) MIMO detectors while maintaining the same performance. In at least some embodiments, a scaling process is provided to reduce complexity of computations performed by a MIMO detector. As will be described herein, an equalized channel output, an equalized channel matrix and/or a noise-variance estimation can be scaled.

Figure 1:
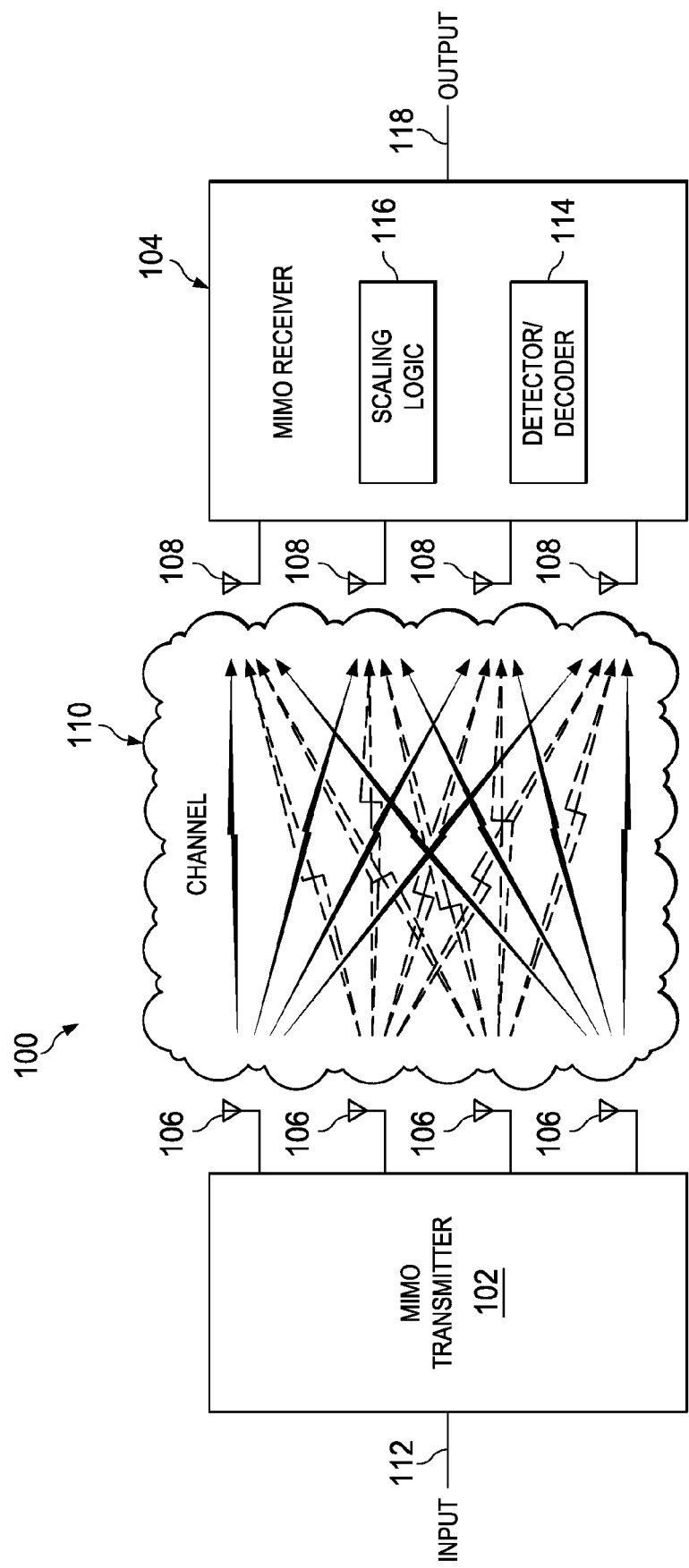
FIG. 1 illustrates a wireless communication system in accordance with embodiments of the disclosure.

FIG. 1 shows an illustrative embodiment of a wireless communication system 100 in accordance with embodiments of the invention. As shown, the wireless communication system 100 comprises a MIMO transmitter 102 having at least one antenna 106 for transmitting radio frequency signals received as input 112. The MIMO transmitter 102 may represent a fixed or portable wireless device, a cellular phone, a personal digital assistant, a wireless modem card, or any other device configured to transmit on a MIMO wireless network. In FIG. 1, a MIMO receiver 104 is configured to receive radio frequency signals transmitted by the MIMO transmitter 102. The MIMO receiver 104 has at least one antenna 108 for receiving transmitted radio frequency signals.

As shown, the MIMO transmitter 102 transmits radio frequency signals to the MIMO receiver 104 through a channel 110. While MIMO systems may greatly increase spectral efficiency, the process of separating signals simultaneously transmitted from multiple antennas 106 may be burdensome for the MIMO receiver 104. To reduce the computational burden for a detector/decoder 114, the MIMO receiver 104 comprises scaling logic 116, which scales the equalization. In at least some embodiments, the scaling logic 116 comprises an Application-Specific Integrated Circuit (ASIC) that receives inputs such as an equalized channel output, an equalized channel matrix and/or a noise-variance estimation and then outputs a scaled version of these inputs. The scaling factor can be, for example, a coefficient from the equalized channel matrix. In some embodiments, each scaled value is obtained based on a divide operation (i.e., divide by the scaling factor). Alternatively, each scaled value is obtained based on a multiplication operation (i.e., multiply by the inverse of the scaling factor). The scaled values are provided to the detector/decoder 114 to enable detection and decoding of incoming signals. After decoding a signal, the MIMO receiver 104 can provide an output 118, which includes the decoded signal.

A MIMO narrowband channel model with N inputs $\alpha=[\alpha_1 \alpha_2 \ldots \alpha_N]^T$ and M outputs $r=[r_1 \ldots r_M]^T$ can be written as:

$$r = H\alpha + w, \quad \text{(Equation 1)}$$

where H is a complex M×N matrix and $w=[w_1, \ldots w_M]^T$ is noise. The noise has the autocorrelation matrix $E[ww^*]=\Sigma^2$. This equation also applies to a single tone in an Orthogonal Frequency Division Multiplexing (OFDM) system or an Orthogonal Frequency Division Multiple Access (OFDMA) system. This channel equation also applies to single-tap Code-Division Multiple-Access (CDMA) channels.

In at least some embodiments, the detector/decoder 114 uses a QR decomposition of the channel. This decomposition is defined as follows:

$$\begin{bmatrix} H \\ \alpha\hat{\sigma}I \end{bmatrix} = \Pi \begin{bmatrix} Q \\ \alpha\hat{\sigma}\Pi R^{-1} \end{bmatrix} R = \tilde{Q}R, \quad \text{(Equation 2)}$$

where $\tilde{Q}$ is an (M+N)×N matrix with orthonormal columns, R is an N×N triangular matrix with positive and real diagonals, $\Pi$ is an N×N permutation matrix, $\hat{\sigma}$ is an estimate of $\sigma$, and $\alpha$ is a chosen parameter (example values are 0 and 1, but any non-negative real value is valid). A permutation matrix is defined as any matrix with a single element in each row and column that has the value of one, while all other elements have the value zero. This disclosure describes the algorithm assuming a lower triangular R matrix. Alternatively, embodiments can implement an algorithm for an upper triangular R matrix as would be understood by those skilled in the art.

The optimal value of the parameter a depends on the type of MIMO detector that is used. For example, $\alpha=1$ is optimal for a linear receiver because it minimizes the error, $\|R^{-1}Q^H y - s\|^2$. On the other hand, $\alpha=0$ is optimal for a max-log (ML) receiver. When $\alpha=1$, the equalization is called minimum mean-squared error (MMSE) equalization. When $\alpha=0$, the equalization is called zero-forcing (ZF) equalization. Thus, an appropriate parameter can be selected for the detector/decoder 114 depending on whether a MMSE equalizer or a ZF equalizer is being implemented. When $\alpha=0$, the QR decomposition may be simplified to:

$$H\Pi = QR. \quad \text{(Equation 3)}$$

The way the permutation matrix $\Pi$ is defined impacts performance for some MIMO detectors. For example, the BLAST ordering chooses $\Pi$ to maximize the minimum diagonal of R. A less complex way to choose $\Pi$ is the sorted-QR decomposition that attempts to maximize $R_{1,1}$ (lower triangular R). The complexity reduction from scaling can work with any choice of the permutation matrix The MIMO detector problem can be transformed into an easier problem by creating an effective channel that is triangular. One way to achieve this uses the conjugate transpose of Q as follows:

$$y = Q^H r = Rs + n, \quad \text{(Equation 4)}$$

where $s=\Pi^{-1}\alpha=[s_1 s_2 \ldots s_N]^T$ is a permutation of the channel input vector, and n is an effective noise. Note that n may be a function of a when $\alpha \neq 0$. The constellation for the i-th symbol is defined as $s_{k,i} \in A_i$. The set containing all valid values of a subset of the channel inputs is denoted as $A_{N_1}^{N_2}$, which means $[s_{N_1}, s_{N_1+1}, \ldots, s_{N_2}]^T \in A_{N_1}^{N_2}$ where $N_1 \leq N_2$. The set that contains all the elements of any one-dimensional constellation A whose j-th bit have the value k is denoted as A(k,j). For example, $A_i(k,j)$ is the set of all valid values of $s_i$ whose j-th bit have the value k. The set that contains all the elements of any multi-dimensional constellation $A_{N_1}^{N_2}$ whose j-th bit in the i-th symbol have the value k is denoted as $A_{N_1}^{N_2}(k,i,j)$.

Figure 2:
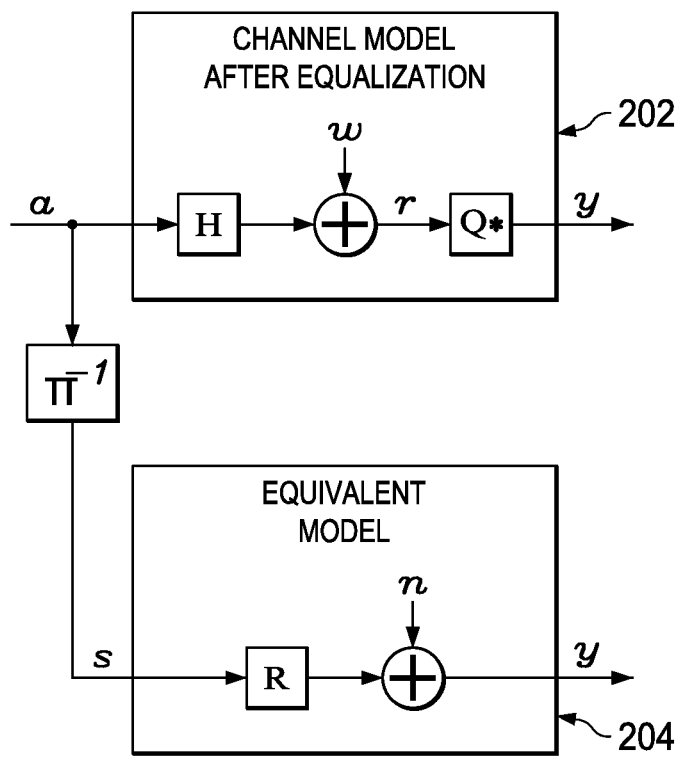
FIG. 2 shows equivalent channel models after equalization in accordance with embodiments of the disclosure.

FIG. 2 shows equivalent channel models with equalization in accordance with embodiments of the disclosure. Specifically, block 202 shows the channel model $r=H\alpha+w$ as in Equation 1 and the equalization $y=Q^H r$ as in Equation 3. Note that $Q^H$ and $Q^*$ (in FIG. 2) both refer to the conjugate transpose of Q. Block 204 shows an equivalent channel and equalization model in which $y=Rs+n$ as in Equation 4.

In at least some embodiments of the detector/decoder 114, the equalization may be done using another matrix besides $Q^H$. In other words, the equalization can be represented as:

$$y = Fr. \quad \text{(Equation 5)}$$

In the case of QR decomposition, $F=Q^H$. Alternatively, in the case of a matched filter, $F=H^H$. Different embodiments of the detector/decoder 114 may use different implementations of the matrix F. The scaling technique described in this disclosure can be applied to any choice of the matrix F.

An important quantity for many MIMO detectors is the mean-squared error (MSE). The MSE of a vector $\hat{s}$ after equalization is defined as:

$$\text{MSE}(\hat{s}) = (y - R\hat{s})^H (E[nn^H])^{-1} (y - R\hat{s}). \quad \text{(Equation 4a)}$$

In at least some embodiments, the detector/decoder 114 may be an ML detector that computes the MSE for different candidates $\hat{s}$. Likewise, the MSE of a vector $\hat{s}$ without equalization is defined as:

$$\text{MSE}(\hat{s}) = (r - H\Pi\hat{s})^H (E[ww^H])^{-1} (r - H\Pi\hat{s}) = (r - H\hat{\alpha})^H (E[ww^H])^{-1} (r - H\hat{\alpha}). \quad \text{(Equation 5a)}$$

Due to properties of the additive noise and/or the equalization, or due to some receiver processing, the autocorrelation of the noise is often approximated as $E[ww^*]=I\sigma^2$. For example, the autocorrelation matrix of the noise after left multiplying the channel output r by $\Sigma^{-1}$ is the identity matrix (i.e., $E[ww^*]=I$). In this case, the MSE computations from Equations 4a and 5a simplify to $\text{MSE}(\hat{s})=(y-R\hat{s})^H(y-R\hat{s})/\sigma^2=\|y-R\hat{s}\|^2/\sigma^2$ and $\text{MSE}(\hat{s})=\|r-H\Pi\hat{s}\|^2/\sigma^2$, respectively. It is convenient to define the cost of a vector $\hat{s}$ after equalization as:

$$C(\hat{s}) = \|y - R\hat{s}\|^2. \quad \text{(Equation 4b)}$$

Likewise, it is convenient to define cost of a vector $\hat{s}$ without equalization as:

$$C(\hat{s}) = \|r - H\Pi\hat{s}\|^2 = \|r - H\hat{\alpha}\|^2. \quad \text{(Equation 5b)}$$

The output of an ML detector is the log-likelihood ratio (LLR) of each bit transmitted in the vector s, where the LLR value indicates the probability that a given bit was transmitted as a one or zero. The ML detector output for the j-th bit of the i-th symbol is described by a single equation:

$$\lambda_{i,j} = (C(s^{(o)}) - C(s^{(1)}))/\hat{\sigma}^2, \quad \text{(Equation 6)}$$

where $\|r - H\Pi s^{(k)}\|^2$ is minimized under the constraint that $s^{(k)} \in A_1^N(k,i,j)$. The cost is computed according to Equation 4b or Equation 5b depending on the equalization employed by the receiver.

In some embodiments, the detector/decoder 114 may be a list detector that computes the cost for different candidates $\hat{s}$. A list detector is any detector that generates a list of candidate vectors for the channel input and computes the cost for each candidate. The set of candidate vectors is labeled as the set L, and the number of candidates in the set is called the list length. The ML detector is an example of a list detector with an exhaustive list (i.e., $L=A_1^N$). Alternatively, many list detectors generate their lists to be as small as possible without sacrificing too much performance. Note that at least some list detectors are implemented to share common computations between different candidate vectors in the set L. For example, when N=2 $C(\hat{s})=\|y-R\hat{s}\|^2=|y-r_{1,1}\hat{s}_1|^2+|y-r_{2,1}\hat{s}_1-r_{2,2}\hat{s}_2|^2$. In such case, for all candidates of $\hat{s}$ in the set L which have the same value for $\hat{s}_1$, the term $|y-r_{1,1}\hat{s}_1|^2$ can be computed only once.

Given the set L generated by any list detector, the LLR for the j-th bit of the i-th symbol may be computed in a manner similar to the ML detector in Equation 6 as:

$$\lambda_{i,j} = (C(s^{(o)}) - C(s^{(1)}))/\hat{\sigma}^2, \quad \text{(Equation 7)}$$

where $C(s^{(k)})$ is minimized subject to the constraints $s^{(k)} \in A_1^N(k,i,j)$ and $s^{(k)} \in L$. Again, the cost is computed according to Equation 4b or Equation 5b depending on the equalization employed by the receiver.

Thus, the ML and list detectors are two examples of the detector/decoder 114 that involve computing the cost for multiple values of $\hat{s}$. Other MIMO detectors that also involve computing the cost for multiple values of $\hat{s}$ include the maximum-likelihood and sphere detectors. In some embodiments, computing the cost involves multiplying the matrix R by the vector $\hat{s}$. If the detector/decoder 114 has many candidate vectors $\hat{s}$, then repeatedly multiplying R and $\hat{s}$ creates a heavy computational burden. Thus, a scaling technique that can reduce the complexity of this computation is employed.

Consider the computation of $C(\hat{s})=\|y-R\hat{s}\|^2$, when N=2 and a QR decomposition is used for equalization. In such case:

$$\|y - R\hat{s}\|^2 = \left\| \begin{bmatrix} y_1 \\ y_2 \end{bmatrix} - \begin{bmatrix} R_{1,1} & 0 \\ R_{2,1} & R_{2,2} \end{bmatrix} \begin{bmatrix} \hat{s}_1 \\ \hat{s}_2 \end{bmatrix} \right\|^2 \quad \text{(Equation 8)}$$

Factoring out the term $R_{2,2}^2$ yields:

$$\|y - R\hat{s}\|^2 = R_{2,2}^2 \left\| \begin{bmatrix} y_1/R_{2,2} \\ y_2/R_{2,2} \end{bmatrix} - \begin{bmatrix} R_{1,1}/R_{2,2} & 0 \\ R_{2,1}/R_{2,2} & 1 \end{bmatrix} \begin{bmatrix} \hat{s}_1 \\ \hat{s}_2 \end{bmatrix} \right\|^2 \quad \text{(Equation 9)}$$

If the norm is computed for L different values of $\hat{s}$, then the norm in Equation 9 requires four multiplications by $1/R_{2,2}$ and 2L multiplications by $\hat{s}_1$. In contrast, the norm in Equation 8 requires 2L multiplications by $\hat{s}_1$, and L multiplications by $\hat{s}_2$. If L>4, then computing the norm according to Equation 9 requires fewer multiplications. However, when equation 9 is used to compute the cost $\|y-R\hat{s}\|^2$, the factor $R_{2,2}^2$ still needs to be accounted for. This factor is common to the costs of all the candidate vectors $\hat{s}$ and can be accounted for without the direct multiplication shown in Equation 9. For example, the LLRs can be computed using the following equation instead of Equation 2:

$$\lambda_{i,j} = (\|y - Rs^{(o)}\|^2/R_{2,2}^2 - \|y - Rs^{(1)}\|^2/R_{2,2}^2)/\hat{\sigma}^2/R_{2,2}^2 \quad \text{(Equation 10)}$$

Equation 10 can be rewritten as:

$$\lambda_{i,j} = (\|\tilde{y} - \tilde{R}s^{(o)}\|^2 - \|\tilde{y} - \tilde{R}s^{(1)}\|^2)/\tilde{\sigma}^2, \quad \text{(Equation 11)}$$

where $\tilde{y}=y/R_{2,2}$, $\tilde{R}=R/R_{2,2}$, and $\tilde{\sigma}^2=\hat{\sigma}^2/R_{2,2}^2$. In Equations 10 and 11, the vector y is the equalized channel output, the matrix R is the equalized channel matrix and $\hat{\sigma}^2$ is the noise-variance estimation. In the above example, y and R are scaled by $1/R_{2,2}$ and $\hat{\sigma}^2$ is scaled by $1/R_{2,2}^2$. Other scaling factors are possible as well.

Figure 3:
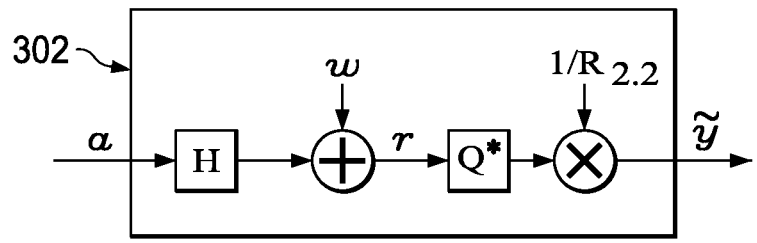
FIG. 3 shows an equalization model with scaling in accordance with embodiments of the disclosure.

FIG. 3 shows an equalization model with scaling in accordance with embodiments of the disclosure. In FIG. 3, block 302 shows the channel model r=Ha+w as in Equation 1 and the equalization $y=Q^Hr$ as in Equation 3. Further, block 302 shows a scaling factor where $\tilde{y}=y/R_{2,2}$.

Computing the LLR according to Equation 2 requires $L \cdot N(N+1)/2$ multiplications between coefficients in R and $\hat{s}$. Computing the LLR according to equation 11 requires $L(N(N+1)/2-1)$ multiplications between coefficients in R and $\hat{s}$, in addition to $N+N(N+1)/2+1$ multiplications by $1/R_{2,2}$ (N for $\tilde{y}$, $N(N+1)/2-1$ for $\tilde{R}$, and 2 for $\hat{\sigma}^2/R_{2,2}^2$). Therefore, when $L > N^2/2 + 3N^2/2 + 1$ using equation 11 to compute the LLR requires fewer multiplications.

For channels where $R_{N,N}$ is rarely less than one and often greater than one, the proposed scaling may allow the coefficients in ỹ and R̃ to be represented with fewer bits than the coefficients in R and y. This is the second way in which the proposed scaling can reduce complexity.

The proposed scaling method can be generalized to force any element in the matrix R to one. In some embodiments, $R_{N,N}$ is set to 1 because it is a real number and because in most cases it has a larger expected value than the other diagonals of R.

For some embodiments of the detector/decoder 114, the cost of the vector $\hat{\alpha}$ may be computed as:

$$MSE(\hat{\alpha}) = \|r - H\hat{\alpha}\|^2 \quad \text{(Equation 12)}$$

In this case the scale factor can be chosen from the matrix H to reduce the complexity of multiplying a matrix by the vector $\hat{\alpha}$.

Figure 4:
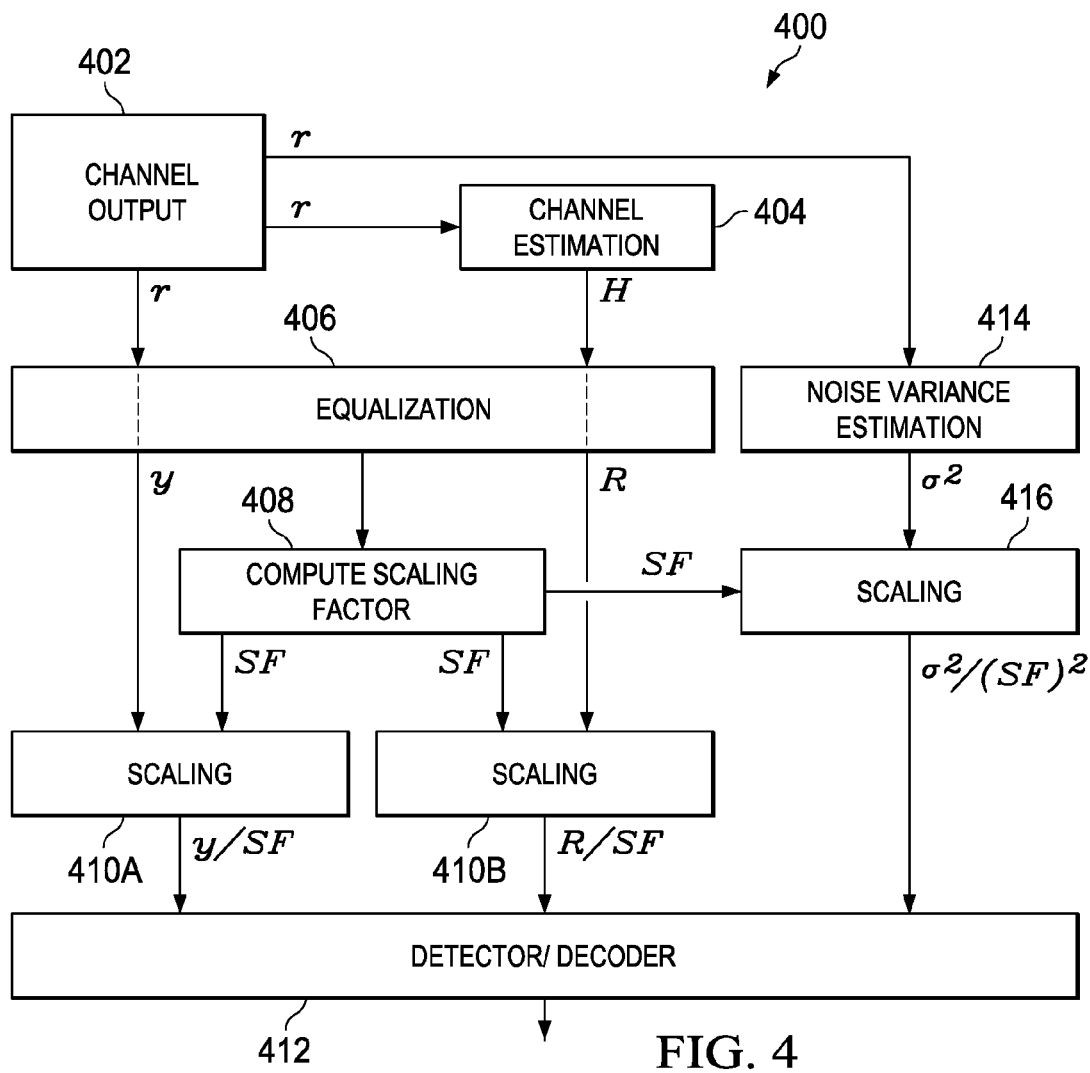
FIG. 4 shows a block diagram of a receiver in accordance with embodiments of the disclosure.

FIG. 4 shows a block diagram of a receiver 400 in accordance with embodiments of the disclosure. In FIG. 4, the channel output block 402 represents an incoming signal from a channel (e.g., a MIMO channel). In some embodiments, the channel output (r) is provided to a channel estimation block 404, which estimates the MIMO channel and outputs the channel matrix H. In other embodiments, the channel matrix H may have been estimated previously by other means and stored. The channel output r is also provided to a noise-variance estimation block 414, which estimates the noise variance ($\hat{\sigma}^2$) of the channel output r. As shown, an equalization block 406 equalizes the channel output r and the channel matrix H yielding the equalized channel output y and the equalized channel matrix R. In some embodiments, the outputs and inputs are equivalent (i.e., y=r and R=H). The equalized channel output and the equalized channel matrix are scaled by the scaling blocks 410A and 410B respectively. As shown, the scaling blocks 410A and 410B receive a computed scaling factor (SF) from a compute scale factor block 408. In at least some embodiments, the SF is computed by factoring out a coefficient from the equalized channel matrix. In other embodiments, the SF could be a complex scale factor that reduces one of the coefficients from a complex value to a real value. In summary, SF could be $1/\text{Re}(R_{i,j})$, $1/\text{Im}(R_{i,j})$, $1/R_{i,j}^*$, or $R_{i,j}/|R_{i,j}|^2$, where $R_{i,j}$ is the element at the i-th row and j-th column of the matrix R. When R is a triangular matrix, the preferred embodiment is $SF=1/\text{Re}(R_{i,j})$. The equalized and scaled versions of the channel output and the channel matrix are forwarded to the detector/decoder 412. Also, the noise-variance estimation can be scaled by a scaling block 416. The scaling process can advantageously reduce the computational burden of the detector/decoder 114 by reducing the number of multiplication and/or by reducing the number of bits needed to represent the channel matrix. The blocks of FIG. 4 can be representative of hardware, firmware, and/or software as would be understood by one of skill in the art.

Figure 5:
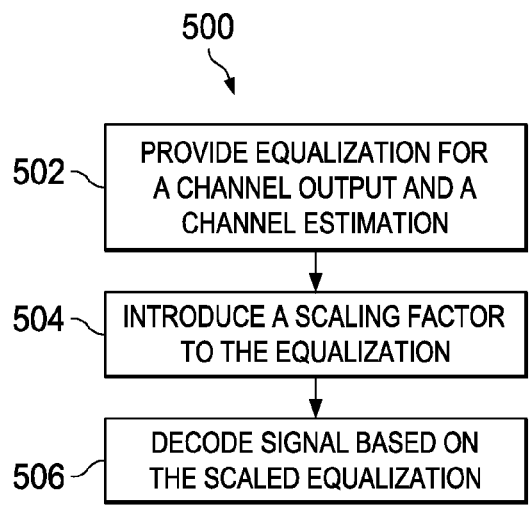
FIG. 5 illustrates a method in accordance with embodiments of the disclosure.

FIG. 5 illustrates a method 500 in accordance with embodiments of the disclosure. As shown in FIG. 5, the method 500 comprises providing equalization for a channel output and a channel estimation (block 502). A scaling factor is introduced to the equalization (block 504). For example, a coefficient of an equalized channel estimation matrix can be factored out to reduce the number of coefficients in the channel estimation matrix and/or to reduce the number of bits needed to represent the channel estimation matrix. In at least some embodiments, a coefficient along a diagonal of the channel estimation matrix is factored out. A signal is then decoded based on the equalized and scaled versions of the channel output and the channel estimation matrix (block 506). In at least some embodiments, the noise-variance estimation from the channel output can also be scaled. The scaling feature reduces the computational burden of the decoding process.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A receiver for a wireless communication system, comprising:
    an equalizer that provides an equalized channel matrix;
    a compute scale factor block to compute a scaling factor (SF), wherein the SF is computed by factoring out a coefficient from the equalized channel matrix, to set any element in the equalized channel matrix to one;
    a first scaling block coupled to the equalizer and the compute scale factor block for applying a computed scaling factor (SF) to the equalized channel output;
    a second scaling block coupled to the equalizer and the compute scale factor block operable for applying a computed scaling factor (SF) to the equalized channel matrix; and
    a decoder coupled to the first and second scaling blocks, wherein the decoder decodes a signal based on the equalized/scaled channel matrix and the equalized/scaled channel output.

2. The receiver of claim 1 further comprising a noise-variance estimator that provides a noise-variance estimation to a third scaling block, wherein the third scaling block selectively scales the noise variance estimation using the computed scaling factor (SF) and wherein the decoder decodes a signal based on the scaled noise-variance estimation.

3. The receiver of claim 1 wherein the decoder uses a QR decomposition associated with a channel.

4. The receiver of claim 3 wherein the decoder assumes a lower triangular channel matrix for the QR decomposition.

5. The receiver of claim 3 wherein the decoder assumes an upper triangular channel matrix for the QR decomposition.

6. The receiver of claim 1 wherein the decoder implements one of a minimum mean-squared error (MMSE) equalization and a zero-forcing (ZF) equalization.

7. The receiver of claim 1 wherein the receiver comprises one of a max-log receiver and a sphere detector receiver.

8. The receiver of claim 1 wherein the decoder comprises a list detector that supports an exhaustive list of candidates.

9. The receiver of claim 1 wherein the decoder comprises a list detector that supports less than an exhaustive list of candidates.

10. The receiver of claim 1 wherein the equalized channel matrix with scaled coefficients reduces the number of multiplications performed by the decoder.

11. The receiver of claim 1 wherein the equalized channel matrix with scaled coefficients reduces a number of bits used to represent the equalized channel matrix.

12. The receiver of claim 1 wherein the factored out coefficient is on a diagonal of the equalized channel matrix.

* * * * *